United States Patent [19]

Wavrunek

[11] 3,730,477
[45] May 1, 1973

[54] BRACKET SUPPORT UNIT FOR INTEGRAL WALL CONSTRUCTION

[75] Inventor: John R. Wavrunek, Arlington Heights, Ill.

[73] Assignee: Capitol Hardware Manufacturing Company, Inc., Chicago, Ill.

[22] Filed: Nov. 1, 1971

[21] Appl. No.: 194,360

[52] U.S. Cl. .......................248/243, 52/36, 211/148
[51] Int. Cl. .............................A47g 29/02, A47f 5/08
[58] Field of Search.......................248/243, 244, 245; 211/148, 134; 108/108, 107, 106, 110; 52/36

[56] References Cited

UNITED STATES PATENTS

| | | | |
|---|---|---|---|
| 3,648,419 | 3/1972 | Marks | 52/36 |
| 3,407,547 | 10/1968 | Doke et al. | 52/36 |
| 2,731,228 | 1/1956 | Baldwin et al. | 248/300 |
| 3,202,296 | 8/1965 | Drack | 211/148 X |
| 3,316,863 | 5/1967 | Zock | 108/108 |
| 3,265,217 | 8/1966 | Biggs | 211/148 X |

*Primary Examiner*—J. Franklin Foss
*Attorney*—Sidney Wallenstein et al.

[57] ABSTRACT

A bracket support unit to be mounted at any one of a number of selected elevations between a pair of closely spaced apart vertical wall-forming support studs and fastened thereto by laterally directed power driven fasteners. The bracket support unit preferably includes a heavy gauge elongated extruded member of aluminum or the like which forms a housing and snugly fits between the closely spaced apart support studs. Laterally extending oppositely directed stop flanges are formed at the forward end of the extruded member to overlie the forward ends of the studs. The extruded housing has a narrow channel therein which receives an elongated slotted bar made of steel or the like, the slots of which are adapted to receive the teeth of a bracket at any one of a number of points therealong. The bar has spaced notches formed along the longitudinal side edges thereof which receive punched or stamped projections formed on the extruded housing to fix the position of the bar in the channel.

7 Claims, 11 Drawing Figures

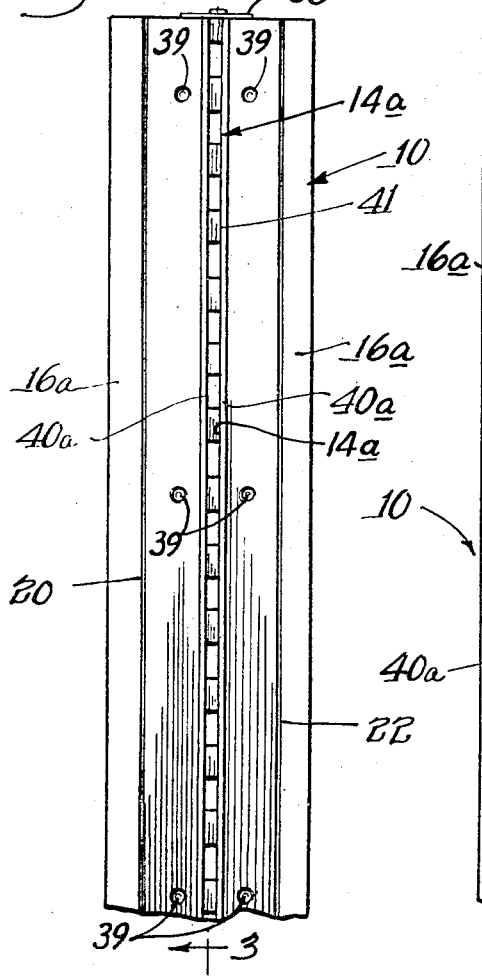
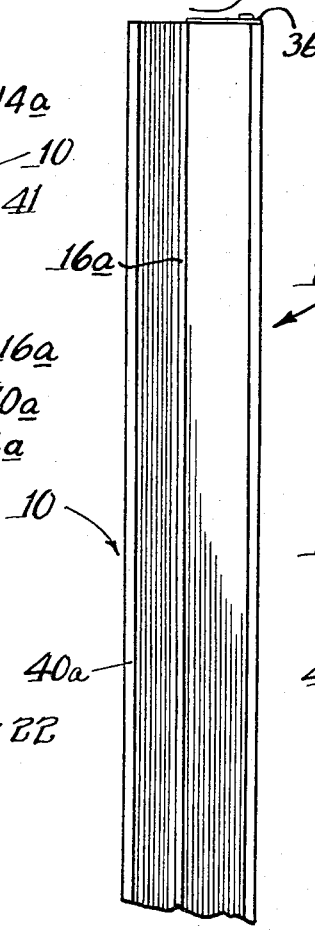
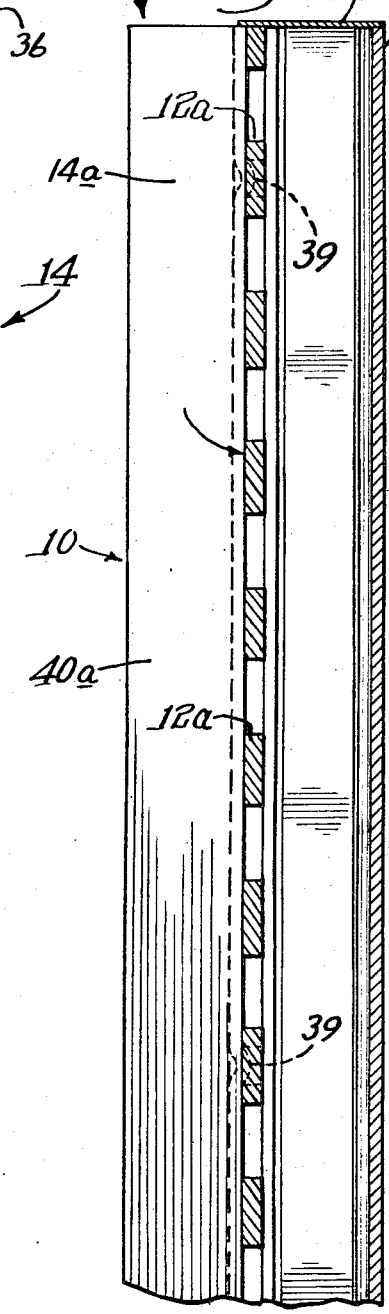
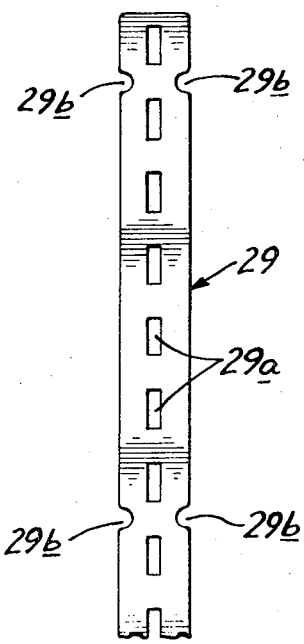
Inventor
JOHN R. WAYRUNEK

Inventor
JOHN R. WAYRUNEK
By: Wallenstein, Spangenberg, Hattis & Strampel attys

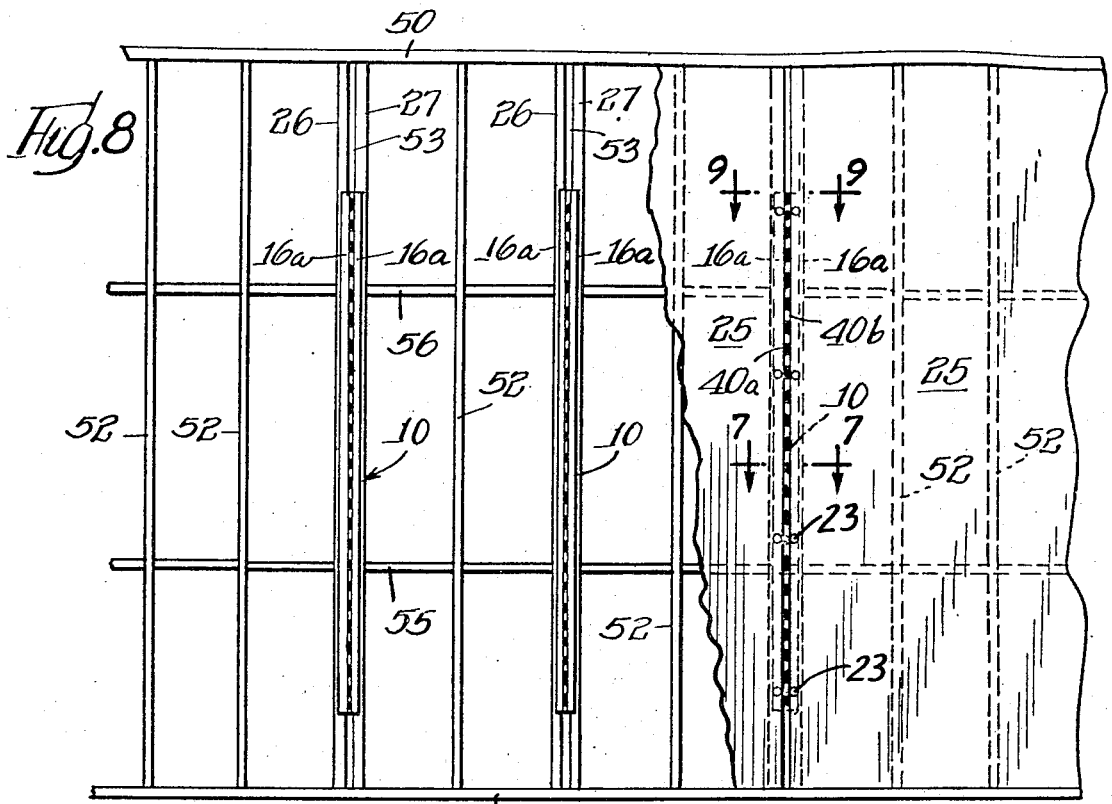
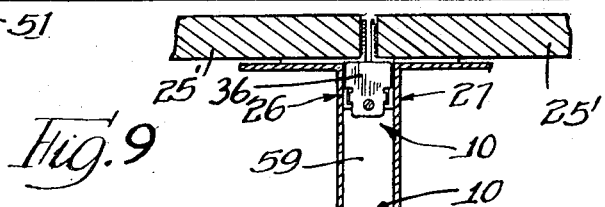
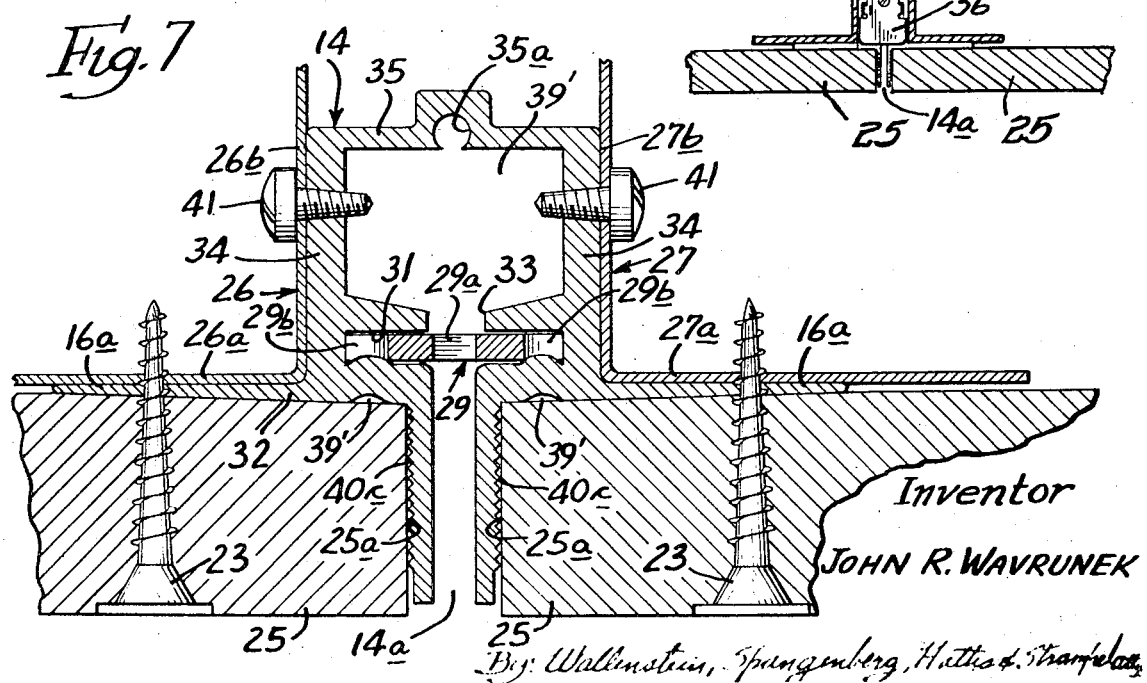

BRACKET SUPPORT UNIT FOR INTEGRAL WALL CONSTRUCTION

This invention relates generally to bracket support apparatus to be integrated into wall constructions.

Bracket support units generally are provided with vertically spaced slots for receiving the hooks or teeth of shelf support brackets. The location of the brackets are readily selectively changeable by manual positioning of the shelf brackets in selected ones of the slots.

Some of the prior art types of bracket support units are built into the wall and form an integral part of the wall studding. One common form of this type of bracket support unit is used with a specially designed sheet metal stud having a vertical slide channel in which a slotted bar is slidably disposed with mounting tabs extending to the outside of the stud. The slotted bar is anchored in place at the desired elevation by fasteners driven through the tabs into the studs. The vertical adjustability of the slotted bar is necessary to provide for the leveling of the bracket-receiving slots of adjacent studs. To make these specially designed studs economical to fabricate, the sheet metal used to make the studs into the intricate channel forming shape involved had to be of relatively thin gauge metal which could not readily support heavy loads without some deformation ultimately resulting in an uneven elevation of the brackets supported on adjacent studs, and the cracking of topping compound used to bridge the joints between the dry wall panels supported on the studs.

An improvement in these bracket support units comprises a bracket support unit to be mounted at any one of a number of selected locations between a pair of closely spaced apart vertical wall-forming support studs and fastened thereto by laterally directed power driven fasteners. The bracket support unit preferably includes a pair of heavy gauge elongated extruded members of aluminum or the like which is secured together in confronting relation to form a housing for an elongated channel-shaped slotted bracket teeth-receiving member anchored within the housing by screws or the like driven through the side walls of the extruded members and the flanges of the channel-shaped member.

The housing has laterally extending opposite directed stop flanges at the front side thereof which overlie the forward ends of the studs between which the bracket receiving support unit is to be mounted at the desired elevation. Wallboard panels may be fastened to the support unit by fasteners such as screws passing through the wallboard panels, the stop flanges of the housing and the studs to form a more rigid overall wall construction.

The present invention constitutes an improvement in the last described support unit construction which reduces the cost of manufacture thereof. The housing of the bracket support unit is most advantageously a single piece extruded member made of aluminum of the like which includes a shallow vertical channel in which is mounted an elongated bracket-receiving bar made of steel or the like. The bar has longitudinally spaced notches formed along the longitudinal edges thereof which notches receives punched or stamped projections, preferably formed on the front face of the housing stop flanges, which project into the notches of the elongated bar to fix the position thereof within the housing. The punching operation which anchors the steel bar in place is a very inexpensive operation which can be carried out with stamping equipment which can simultaneously punch a large number of projections in the housing flanges.

The above described and other features and advantages thereof will be more fully understood upon making reference to the specification to follow, the claims and the drawings wherein:

FIG. 1 is a front elevational view of a bracket support unit constructed in accordance with this invention;

FIG. 2 is a side elevational view of the bracket support unit of FIG. 1;

FIG. 3 is an enlarged vertical sectional view of the bracket support unit taken along the section line 3—3 of FIG. 1;

FIG. 4 is a front elevational view of a slotted bar forming the bracket teeth-receiving portion of the bracket support unit of FIGS. 1-4;

FIG. 7 is an enlarged horizontal cross-sectional view of the bracket support unit of FIGS. 1-3 when it is mounted in place between a pair of studs and wallboard panels have been secured thereto;

FIG. 8 is an elevational view of a wall construction using the bracket support units of this invention;

FIG. 9 is a sectional view showing an enlarged fragmentary view of the wall construction taken along section line 9'—9' of FIG. 8;

Figure 10:
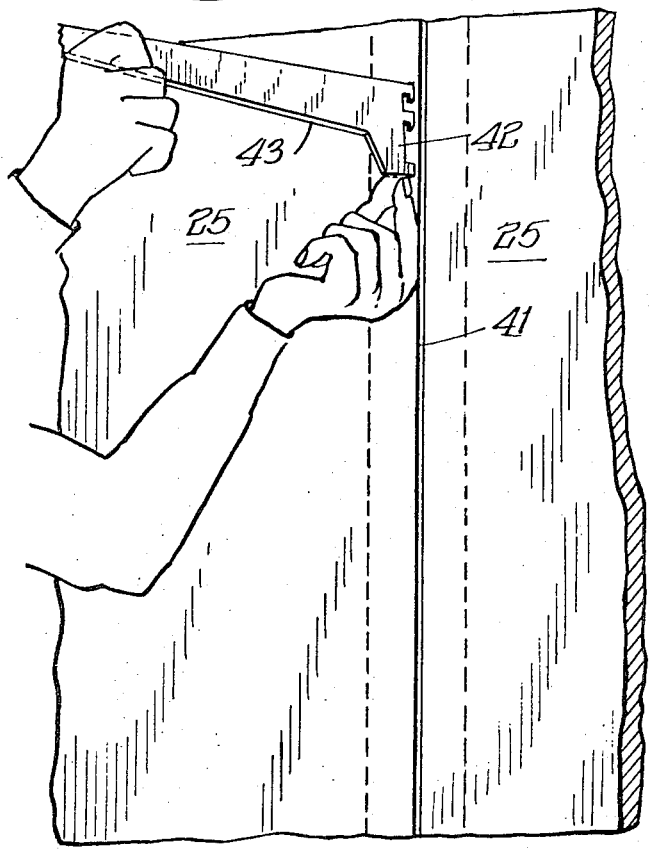
FIG. 10 is an illustration of a portion of a finished wall construction with the bracket support unit mounted therein and showing a bracket being inserted therein.

Referring now to FIGS. 1 and 2 there is seen a bracket support unit 10 constructed in accordance with this invention and including a housing 14 made of an extruded metal like aluminum or the like. The housing has a forwardly facing continuous vertical bracket receiving entryway 14a. The housing 14 is sized to be inserted rearwardly between a pair of back-to-back closely spaced apart support studs 26 and 27 (FIG. 7). Thin stop flanges 16a and 16a, preferably continuous for the entire length of the bracket support 10, extend in opposite directions laterally outwardly from the housing 14 to abut firmly against the forward facing surfaces of the flanges 26a and 27a of the support studs 26 and 27. The housing 14 will generally be cut to a length to form a bracket support unit which extends only for the height required to accommodate the maximum number of tiers of brackets expected to be used. The housing 14 will therefore generally be substantially shorter than the height of the wall to be covered with wallboard panels 25—25 and is readily adjusted upwardly and downwardly between the studs 26 and 27 to the desired height before it is fastened into place. Preferably, each of the flanges 16a and 16a have vertical grooves 20 and 22, respectively, formed therein to facilitate manual application of power driven wallboard fasteners 23 (FIG. 7) which extend through the wallboard panels 25—25, the housing stop flanges 16a and 16a and the flanges 26a and 27a of the wall support studs 26 and 27. The housing 14 includes a slotted bar 29 made of steel or the like having closely vertically spaced centered bracket receiving slots 29a distributed over the length thereof and widely vertically spaced anchoring slots 29b formed in the longitudinal side margins of the bar. The slotted bar 29 is mounted in a shallow vertical channel 31 communicating with the bracket receiving entryway 14 a defined between a front wall 32 of the housing 14 and a pair of ribs 33—33 extending inwardly from housing vertical side walls 34—34. The slotted bar 29 is initially slidably received in the channel 31 but is fixed in place therein when the bracket support unit is manufactured by punching or stamping anchoring projections 39 on the wallboard mounting flanges 16a—16a of the housing 14, the projections 39 extending rearwardly into the channel 31 where they enter the bar notches 29b. The housing side walls 34—34 receive self-tapping screws 41—41 or the like which pass through the webs 26b and 27b of the studs 26 and 27 to mount the bracket support unit at the desired elevation on the studs.

The housing 14 has a rear wall 35 with a screw-receiving opening 35a therein. A space 39' (FIG. 7) defined between the rear wall 35 and ribs 33 and the vertical channel 31 are closed off at the top and bottom of the bracket support unit 10 by fire stop plates 36 which are secured thereto by self-threading screws 37 or the like which threadingly engage the defining walls of the aforesaid holes 35a formed in the rear wall 35 of the housing 14. The stop plates as illustrated having inwardly extending tongues 38—38 (FIG. 7) engaging the inner faces of the housing side walls 34—34.

Figure 11:
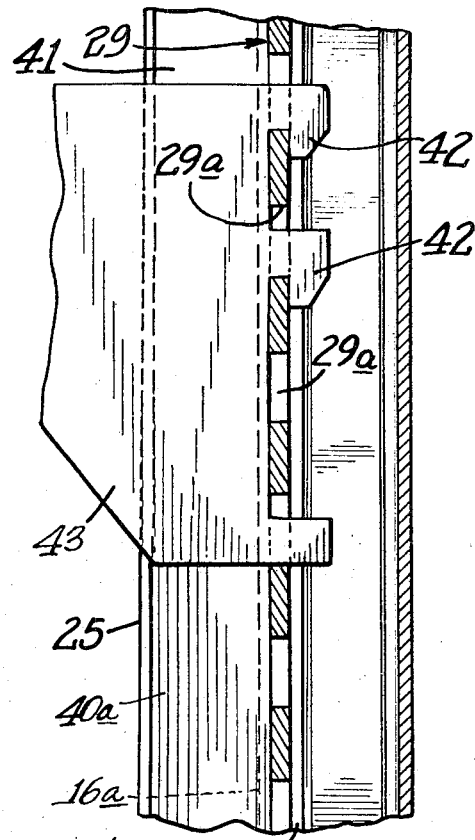
FIG. 11 is a vertical sectional view through the bracket support unit in a wall construction showing the hooked end of a bracket engaged with the slots of a bracket support unit.
Figure 5:
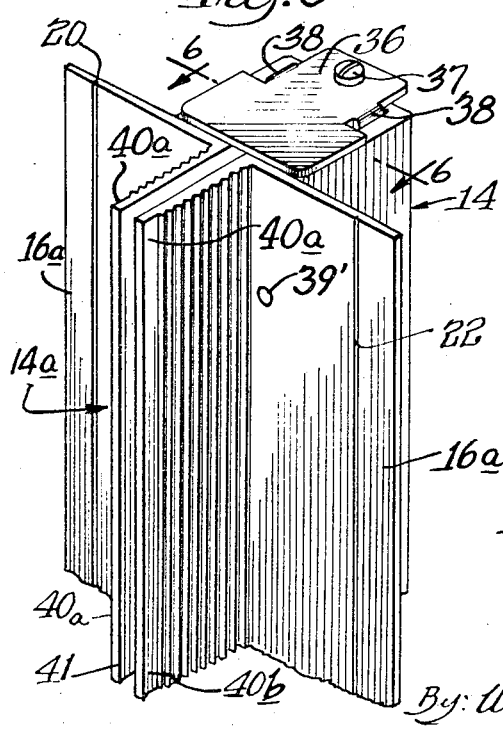
FIG. 5 is a fragmentary perspective view of one end of the bracket support unit of this invention showing a fire stop plate mounted at the end thereof.
Figure 6:
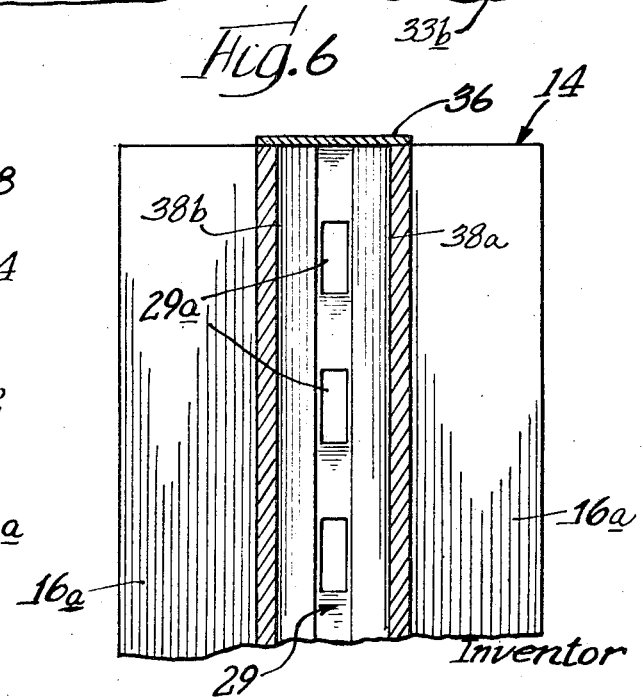
FIG. 6 is a sectional view taken along the section line 6—6 of FIG. 5.

Preferably, the housing 14 has integral forwardly extending wallboard abutment walls 40a and 40a, respectively, against which the terminating side edges 25a of the wallboard panels 25—25 (FIG. 7) abut and which define the aforesaid entryway 14a through which the hooks 42 of a bracket 43 (FIG. 11) is inserted to engage with selected ones of the slots 29a of the slotted member 29. The wallboard abutment walls 40a and 40b of the housing 14 have narrow elongated teeth 40c (FIG. 7) or other wallboard gripping formations formed thereon, frictionally to aid in bonding the topping compound used to fill and finish the end of the wallboard panels.

For a better understanding of the use of the bracket support unit of this invention reference is now made to FIGS. 8 and 9 which illustrate a portion of a wall construction with portions of the wallboard thereof broken away to show the stud construction underneath the wallboard. Here, upper and lower beams 50 and 51, respectively, are provided for receiving a plurality of vertically positioned conventional channel shaped support studs 52, which are fastened thereto by any suitable means, not shown, to provide means for receiving the bracket support unit of this invention. It is only required that two of these conventional studs 26 and 27 be positioned in side-to-side relation with a spacing therebetween sufficient snugly to receive the housing 14 of the bracket support unit 10 which is anchored thereto by the aforesaid self-tapping screws 41 or the like. The closely spaced apart studs 26 and 27 thus provide spaces 53 wherein the bracket support units 10 are inserted. In the usual manner, there may be provided horizontally extending relatively widely vertically spaced apart stringers 55 and 56 to tie together the vertical studs 52, 26 and 27 to form a more rigid wall construction. However, because of the increased rigidity of the wall construction when using the bracket support unit of this invention, the stringers 55 and 56 may be eliminated if desired if permitted by the building code involved. The wallboard panels 25 are positioned against the studs 52 and overlie the stop flanges 16a and 16a of the bracket support units 10, as clearly seen in FIG. 7. With the wallboard panels 25 in position as shown, the fasteners 23 are forced through the wallboard panels 25, the flanges 16a and 16a of housings 14, and the flanges 26a and 27a of the studs 26 and 27. By providing the support unit housing 14 with continuous flanges 16a and 16a to receive the wallboard fasteners 23, the studs 26 and 27 and the bracket support units 10 are rigidly tied together resulting in a more rigid wall structure readily to support heavy loads without deforming the wall.

FIG. 9 shows an enlarged fragmentary sectional view of the wall construction of FIG. 8 as taken along section line 9—9. Here it can be seen that a pair of bracket support units 10 and 10 may be inserted between the same pair of support studs 26 and 27 so that shelves can be mounted on both sides of the wall. Wallboard panels 25'—25' cover the opposite side of the wall in the same manner as the wallboard panels 25—25. When the pair of bracket support units 10 and 10' are used in back-to-back relation as shown in FIG. 9 there remains a space 59 to receive conduits or the like for electrical wiring.

After the wallboard panels are secured in position over the support studs 52 and the flanges 16a and 16a of the bracket support units 10, the wallboard panels 25 and 25' are finished in the customary manner with topping compound (not shown) or other suitable wallboard finishing material to cover the heads of the fasteners 23 and finish all corners and edges of the outer surfaces of the wall construction.

Accordingly, this invention provides an economical bracket support unit preferably which is an assembly of extruded and steel components snugly to fit between closely spaced apart conventional support studs at any desired height and to tie together more rigidly the support studs to form a stronger wall construction, and the bracket support unit provides means rigidly to support the fastener receiving wall portions thereof to withstand the forces exerted thereon. It will be understood that variations and modifications of this invention may be effected without departing from the spirit and scope of the novel concepts disclosed herein.

I claim:

1. A bracket receiving support unit adapted to be mounted between a pair of vertical parallel horizontally closely spaced apart wall support studs to be covered with wallboard or the like, the unit comprising: a housing made of extruded metal having opposite vertical fastener receiving side walls which fit between said closely spaced apart wall support studs to receive mounting fasteners extending laterally through the studs and said side walls, said housing having therein a vertical continuous bracket receiving entryway at the front thereof opening onto a shallow vertical channel; stop flanges formed at the front sides of said housing and extending laterally outwardly therefrom and engageable with said support studs to limit the inward extent to which the bracket receiving support unit can be inserted therebetween, said stop flanges being of a thickness and are positioned to be covered by wallboard and receive wallboard fasteners which are driven through the wallboard, stop flanges and support studs; a bracket receiving bar initially slidably mounted in said shallow vertical channel of said housing and having vertically spaced bracket teeth-receiving slots therein aligned with said housing entryway and distributed over the vertical extent thereof, said bracket receiving bar having vertically spaced anchoring notches; and means anchoring the bracket receiving bar in said housing channel comprising bar anchoring projections punched or stamped from the front faces of said housing stop flanges which projections extend into said vertically spaced notches.

2. The bracket receiving support unit of claim 1 wherein said extruded housing has rear and side walls defining a space within said housing separated from said shallow vertical channel by wall means extending transversely from said housing side walls.

3. The bracket receiving support unit of claim 1 wherein said housing has forwardly extending closely spaced apart parallel wallboard terminating extensions defining said bracket receiving entryway aligned with the slots of said slotted bar and forming abutment shoulders for the ends of the wallboard to be positioned adjacent thereto.

4. The bracket receiving support unit of claim 2 wherein said housing has in said rear wall a fastener receiving opening and there are provided fire stop plates positioned over the top and bottom ends of said housing which cover the ends of the spaces defined by said housing walls, said fire stop plates being secured in position by fasteners extending therethrough and into said fastener receiving opening of said housing rear wall.

5. The bracket-receiving support unit of claim 1 wherein said anchoring notches are located along both longitudinal side margins of said bracket-receiving bar.

6. The bracket-receiving support unit of claim 1 wherein said housing has a vertical length substantially less than the length of the portions of the studs to be covered with wallboard so as to be adjustable bodily upwardly and downwardly between the support studs to a desired elevation.

7. The bracket receiving support unit of claim 2 wherein said entire housing is a single piece of extruded metal.

* * * * *